United States Patent [19]

Maeda et al.

[11] Patent Number: 4,745,587
[45] Date of Patent: May 17, 1988

[54] ECCENTRICITY CORRECTION DURING OPTICAL HEAD ACCESSING OF A DESIRED TRACK

[75] Inventors: Takeshi Maeda, Kokubunji; Masuo Kasai; Koji Muraoka, both of Hachioji, all of Japan

[73] Assignee: Hitachi, Ltd., Tokyo, Japan

[21] Appl. No.: 639,541

[22] Filed: Mar. 14, 1986

[30] Foreign Application Priority Data

Mar. 22, 1985 [JP] Japan .................................. 60-55831
May 31, 1985 [JP] Japan ................................. 60-116416

[51] Int. Cl.$^4$ ..................... G11B 21/08; G11B 7/095
[52] U.S. Cl. ........................................ 369/32; 369/33; 369/41; 369/44
[58] Field of Search ............... 360/75, 77, 78; 369/32, 369/33, 41, 44–47; 358/907

[56] References Cited

U.S. PATENT DOCUMENTS

| | | | |
|---|---|---|---|
| 4,135,217 | 1/1979 | Jacques et al. | 360/78 |
| 4,136,365 | 1/1979 | Chick et al. | 360/78 |
| 4,450,547 | 5/1984 | Nakamura et al. | 369/45 |
| 4,481,613 | 11/1984 | Yokota | 369/32 |
| 4,509,154 | 4/1985 | Kimoto | 369/33 |
| 4,607,358 | 8/1986 | Maeda et al. | 369/44 |
| 4,611,315 | 9/1986 | Ogino | 369/33 |

FOREIGN PATENT DOCUMENTS

| | | | |
|---|---|---|---|
| 56-153562 | 11/1981 | Japan | 369/32 |
| 59-175071 | 10/1984 | Japan | 369/32 |
| 60-052971 | 3/1985 | Japan | 369/32 |

Primary Examiner—Raymond F. Cardillo
Assistant Examiner—Steven R. Garland
Attorney, Agent, or Firm—Antonelli, Terry & Wands

[57] ABSTRACT

Access method and information retrieval apparatus in which an external scale is used during accessing an optical head to a desired track on a rotating recording medium. The number of scale pitches to a target track on the external scale is detected and the speed of the head is controlled by the number of scale pitches. An eccentricity status of the rotating recording medium is previously detected and the number of scale pitches is corrected in accordance with the detected eccentricity status so that a distance of movement in a speed control is corrected and an access time is shortened.

10 Claims, 7 Drawing Sheets

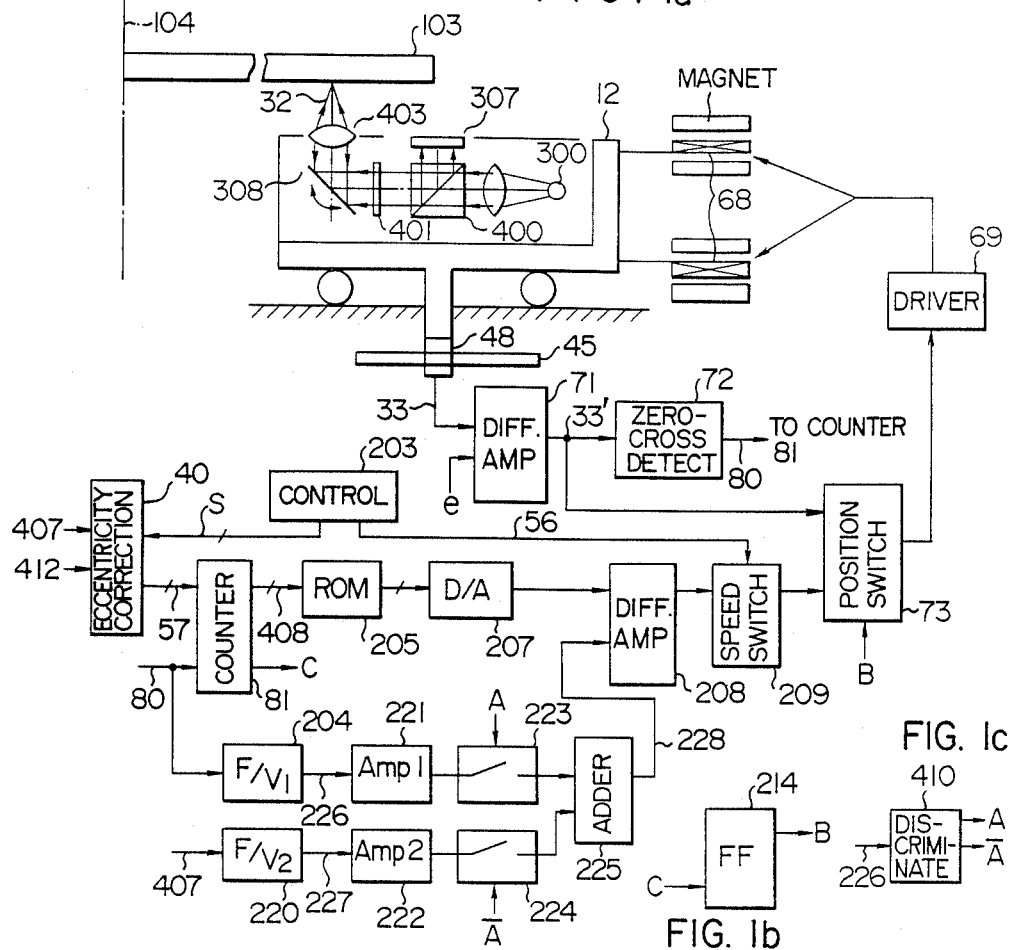
FIG. 1a
FIG. 1b
FIG. 1c
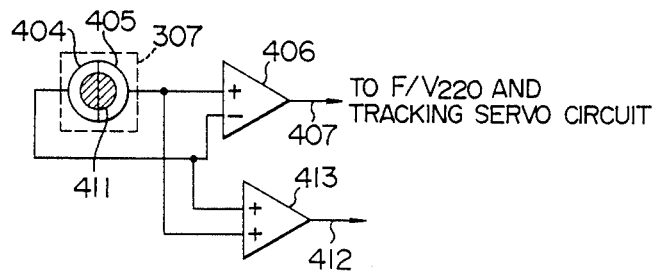
FIG. 2

ECCENTRICITY CORRECTION DURING OPTICAL HEAD ACCESSING OF A DESIRED TRACK

BACKGROUND OF THE INVENTION

The present invention relates to an access method and apparatus for rapidly retrieving desired information from a high density record medium which stores information signals thereon, and more particularly to an access method and apparatus which rapidly and optically retrieves desired information from a rotating optical disk on which information signals are recorded concentrically or spirally at a high density.

The optical disk has a number of concentric or spiral tracks formed thereon at a predetermined pitch, and a number of sectors for delimiting data are formed for each track. In order to record external information at any position or reproduce or erase information recorded at any position, one of the tracks on the disk is sought and one sector on the track is then sought. That is, a macro-seek control (i.e., speed control and position control) in which a light spot is rapidly moved to a neighborhood of a target track, a tracking servo in which the light spot is maintained at a center of the track, and a micro-seek control (for example, jump control) in which a deviation from the target track is corrected are necessary. The access operation in such an optical disk storage is disclosed in Japanese Unexamined Patent Publication Nos. 58-91536 and 58-169370 (corresponding to U.S. patent application Ser. No. 06/443,399, continuation application Ser. No. 06/736,125, now U.S. Pat. No. 4,607,358 and EPC Patent Application No. 82110907.1). In the optical disk storage, the positioning of the light spot is controlled by cooperation of a coarse actuator, such as a linear motor and a fine actuator, such as a galvanomirror. The coarse positioning of the optical head is carried out by the course actuator and an external scale as a position detector, and the fine positioning to the track is carried out by the fine actuator by detecting an address signal recorded on the track. A scale pitch of the external pitch is a multiple of the track pitch.

The macro-seek operation for positioning the optical head to an approximate target position by using the external coarse scale usually effects speed control to reduce an access time. However, since the macro-positioning is carried out by using the external scale which is independent from the track eccentricity, the deviation from the target track varies significantly due to the eccentricity. As a result, the distance of movement of the light spot in the next micro-seek control (for example, jump control) is large and the access time increases. In order to control the speed, a means for detecting the speed of the head is necessary. However, when a separate detector (such as a tachometer) for detecting the speed is mounted, the weight of the head increases and an oscillation at a low frequency may be generated depending on the length of the tachometer. In addition, the cost increases. Accordingly, it is predable to detect the speed by using the output of the external linear scale. A pulse frequency of a zero-crossing detection signal is proportional to the speed of the head. Accordingly, the zero-crossing detection signal is frequency-voltage converted so that the speed is detected based on a voltage. However, the frequency-voltage conversion does not provide an accurate conversion output when the frequency is low (head speed is low), because the pulse interval of the zero-crossing detection signal increases and the speed change in the interval cannot be detected. Accordingly, when the speed is controlled by using the output of the frequency-voltage conversion, the control is unstable when the speed is low and the system may overrun.

SUMMARY OF THE INVENTION

The object of the present invention is to provide an access method rapidly seeking for a desired track from a number of tracks formed on a rotating record medium, and an inprovement on a macro-seek control in which coarse positioning of a head is speed-controlled by using a scale coarser than a track pitch. The effect of any eccentricity is minimized even though an external scale which is independent from the eccentricity is used, when the head is positioned to a target position (target scale point). In this manner, the access time can be reduced. If the optical head is macro-positioned to a vicinity of the target track by the external scale, and then the optical spot is pulled into the track to read out an address recorded on the track to determine a difference from the target track, and the light spot is micro-moved track by track, the distance of the micro-movement varies in accordance with an extent of the track eccentricity and the total access time is increased. In the present invention, the condition or status of the eccentricity is previously detected and the distance of the movement in the macro-seek is corrected depending on the eccentricity so that the distance of the movement in the micro-seek is reduced and the access time is reduced.

In accordance with another feature of the present invention, when the speed of the head is low, a scale having a much finer pitch than the external scale pitch is used so that the head speed, from a high speed to a low speed, can be precisely detected.

BRIEF DESCRIPTION OF THE DRAWINGS

FIGS. 1, 1b, and 1c are a block diagram of one embodiment of the present invention, FIG. 2 is a block diagram of a detector 307 in the embodiment of FIG. 1, FIGS. 3(a)–3(c) are diagrams illustrating an external scale 45 and a detector 48.

DESCRIPTION OF THE PREFERRED EMBODIMENTS

Figure 3A:
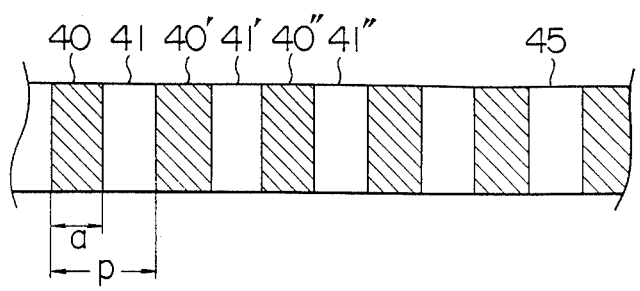

FIG. 1 shows a block diagram of one embodiment of the present invention. A disk 103 rotates around a rotation axis 104. Track guide grooves (not shown) for guiding a light spot 32 are concentrically or spirally formed on the disk. Each of the guide tracks is divided into sectors and each sector includes a header field in which header signals including the sector address and the track address for identifying the sector and track are recorded and a data field following the header field. The guide track function as an optical guide to the light spot 32 which records, reproduces or erases information. The disk 103 comprises a transparent substrate and a recording film formed thereon, and a protection film for protecting the recording film as required. The recording film may be one of various films depending on a recording system. For example, in a pit recording system, a Pb Te Se film may be used, and in an opto-magnetic recording system, a perpendicular anisotropy magnetic film consisting essentially of Tb Fe may be used. The light spot 32 is irradiated to the recording film through the transparent substrate.

A light beam emitted from a semiconductor laser 300 forms the light spot 32 on the recording film of the disk by an object lens 403 through a beam splitter 400, a ¼ wavelength plate 401 and a light deflector 308. A light beam reflected by the disk 103 passes through the object lens 403 and the deflector 308 and is deflected by the beam splitter 400 and directed to a light detector 307, which may comprise a two-divided light detector unit including detectors 404 and 405 as shown in FIG. 2. A distribution pattern 411 on the two-divided light detector unit varies with a tracking error. This fact is utilized to detect a deviation of the light spot from the center of the track. A difference between outputs of the detectors 404 and 405 is produced by a differential amplifier 406 to produce a tracking error detection signal 407. The optical system described above is mounted on an optical head 12 which is attached to a voice coil 68 and moved radially of the disk. A defocusing detection optical system is provided in the optical head 12 so that a focusing error signal is also produced, although it is omitted in FIG. 1 because it may be a known system and does not directly relate to the present invention. An example of the defocusing detection system is disclosed in U.S. Pat. No. 4,450,547.

Attached to the optical head 12 are an external scale 45 and a position sensor 48. In the present embodiment, the external scale is an optical linear scale which uses parallel slits, although it may be of other type, such as a magnetic type.

Figure 3B:
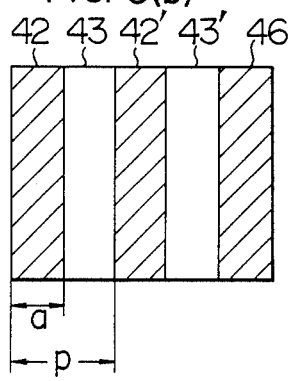
Figure 3C:
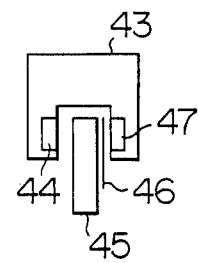
Figure 4A:
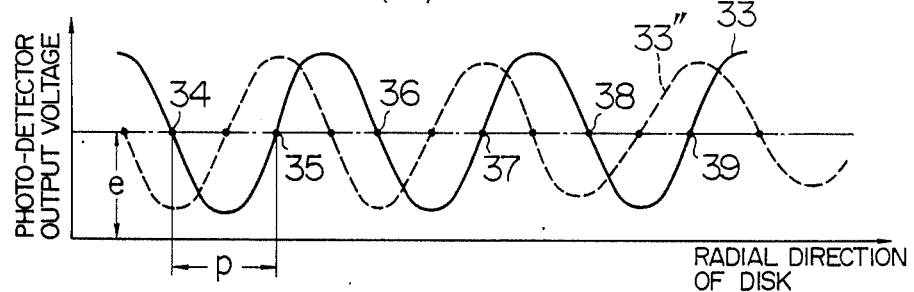
FIGS. 4(a) and 4(b) show detection waveforms of the detector of FIGS. 3(a)–3(c), FIGS. 5(a)–5(e) show waveforms for explaining an operation of the embodiment of FIG. 1.

FIGS. 3(a) to 3(c) show a schematic view of the optical linear scale which uses the parallel slits. A dark and light pattern (stripe pattern) having a pitch P as shown in FIG. 3(a) is formed on the scale 45. Hatched areas 40, 40' and 40" are opaque areas and areas 41, 41' and 41" are transparent areas. A grating 46 having the same dark and light (stripe) pattern as that of the scale 45 as shown in FIG. 3(b) is overlaid on the scale 45 as shown in FIG. 3(c), and a backside thereof is irradiated by a light-emitting diode 44 and a transmitted light is sensed by a light(photo)-detector 47. This principle has been known and hence is not described in detail herein. The position sensor 48 which includes the light-detector 47, grating 46 and light emitting diode 44 in a unit is moved along the linear scale 45 as the optical head 12 moves radially across the disk, and the output 33 of the light-detector 47 changes relative to the radial direction fo the disk as shown in FIG. 4(a). The signal 33 is supplied to a zero-crossing detection circuit 72 (FIG. 1) which produces a pitch detection signal 80 (FIG. 4(b)).

Figure 4B:
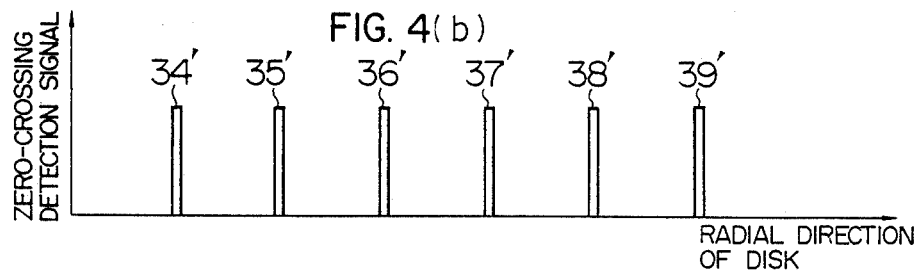

A difference between the signal 33 and a DC component (e) is detected by a differential amplifier 71, which produces a signal 33', and the zero-crossing detection circuit 72 produces pulses 34', 35', 36', 37', 38' and 39' as shown in FIG. 4(b) for zero points 34, 35, 36, 37, 38 and 39 of the signal 33', to generate a pitch detection signal 80.

In order to seek for a desired track, it is necessary to first detect an address written in the track, and compare it with the address of the desired track to determine a distance and a direction of movement of the optical head.

The distance of movement of the optical head is represented by the number N of pulses of the pitch detection signal $$N=[(X-Y)\times(\Delta/p)] \tag{1}$$

where X is the address of the track on which the light spot currently exists, Y is the address of the desired track, $\Delta(\mu m)$ is a track pitch and $p(\mu m)$ is a pitch of the external scale, and [ ] indicates a Gaussian symbol.

$P/\Delta$ tracks are grouped into one block. Thus, the detection signal from the linear scale indicates the blocks. For seeking the desired track, the block number of the block in which the desired track is contained is designated by a controller 203 and a difference from the current block number is calculated. The difference S between the block numbers (which corresponds to the distance of movement in the macro-seek represented by the external scale pitch) is supplied to an eccentricity correction circuit 40. A distance 57 of movement in the macro-seek corrected in accordance with the pre-detected eccentricity is set in a compare counter 81, which is counted down each time the pitch detection signal 80 is applied thereto. The output of the counter 81 is supplied to a ROM 205 which generates a target speed curve. The output of the ROM 205 is supplied to a D/A converter 207 which generates a target speed signal. The eccentricity correction circuit 40 will be explained later.

In order to detect the head speed, the zero-crossing pulse signal 80 from the linear scale is supplied to a frequency-voltage converter (F/V converter) 204 to detect a speed signal 226. The tracking error signal 407 is supplied to an F/V converter 220 to detect a spot-speed signal 227. The spot speed is represented by a sum of the speed of the linear motor and the speed of the fine actuator.

Figure 5A:
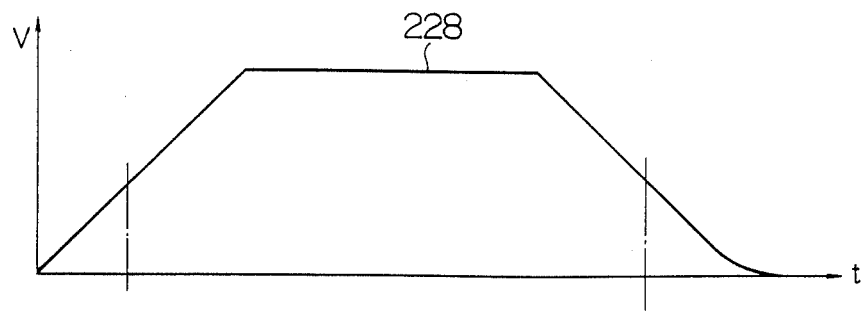
Figure 5B:
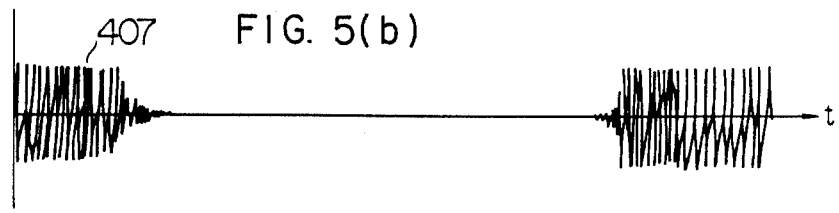
Figure 5C:
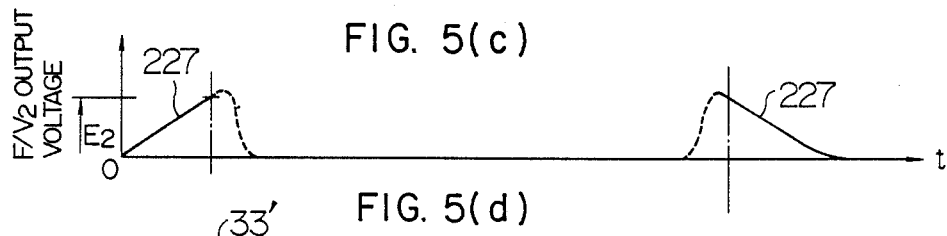
Figure 5D:
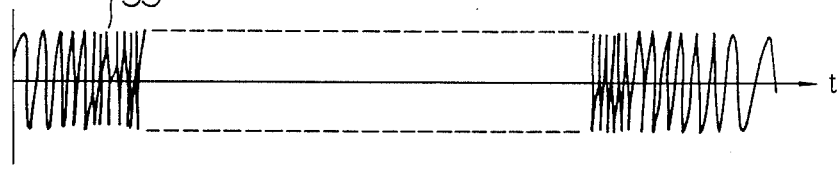
Figure 5E:
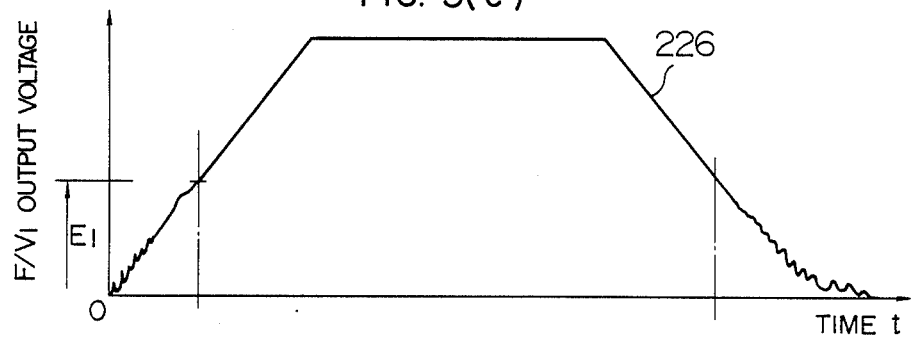

Access operation is started by an access controller 203, and a polarity signal 56 which determines a radial direction of movement of a linear motor 68 is supplied to a polarity switching circuit 209. Thus, the linear motor 68 starts to move with a maximum acceleration. The speed signals 226 and 227 change as shown in FIGS. 5(e) and 5(c), respectively. The signal 226 has a large ripple and does not indicate a correct speed in a low speed range, but the signal 227 indicates a correct speed even in a low speed range. However, in a high speed range, the signal 227 does not indicate a correct speed because of a limit of the detection frequency characteristic of the tracking error signal 407 (FIG. 5(b)).

Thus, the speed signals are switched at points corresponding to $E_1$ and $E_2$ at which the speed signal 226 is stable and the speed signal 227 still indicates the correct speed. The signal 226 is supplied to a speed discrimination circuit 410 FIG. 1c and it is compared with a level $E_1$ to produce one of signals A and $\bar{A}$ of the opposite polarities to control switches 223 and 224. When the signal 226 is lower than $E_1$, the signal 227 is supplied to an adder 225 by the switch 224 through an amplifier 222, and when the signal 226 is higher than $E_1$, the signal 226 is supplied to the adder 225 by the switch 223 through an amplifier 221. Amplification factors of the amplifiers 221 and 222 are selected such the equal outputs are produced for the input levels $E_1$ and $E_2$. As a result, the output of the adder 225 represents a summed speed signal 228 which is a desirable speed detection signal as shown in FIG. 5(a).

The speed detection signal 228 is compared with the target speed signal by a differential amplifier 208. When the actual speed reaches the target speed, a constant speed mode is initiated, and deceleration starts from a certain point. When the signal 226 again falls below the level $E_1$, the speed detection signal is switched to the signal 227 and the stable speed control is attained by the speed signal 227. When the content of the counter 81 reaches "1", a set pulse C is generated to trigger a flip-flop 214 in FIG. 1b, which generates a control signal B to cause a switching circuit 73 to select a positioning control signal rather than the speed control signal.

FIG. 1 shows only the macro-seek control system by the coarse positioning actuator. For the access operation, a tracking control system and a micro-seek control (jump control) system are necessary. They may be known systems. For example, the tracking control system may be a two-stage tracking servo system which couples a coarse actuator and a fine actuator, disclosed in the above-referenced Japanese Unexamined Patent Publication No. 58-91536. A deflector 308 is driven by the tracking error detection signal 407 to control it so that the light spot 32 follows the center of the track. The drive signal of the deflector 308 is supplied to a circuit which simulates a frequency characteristic of the deflector to detect a deviation of the light spot from a center of view field of an object lens 403. The detecton signal is supplied to a drive circuit 69 through a switching circuit 73 to drive the linear motor 68.

Figure 6:
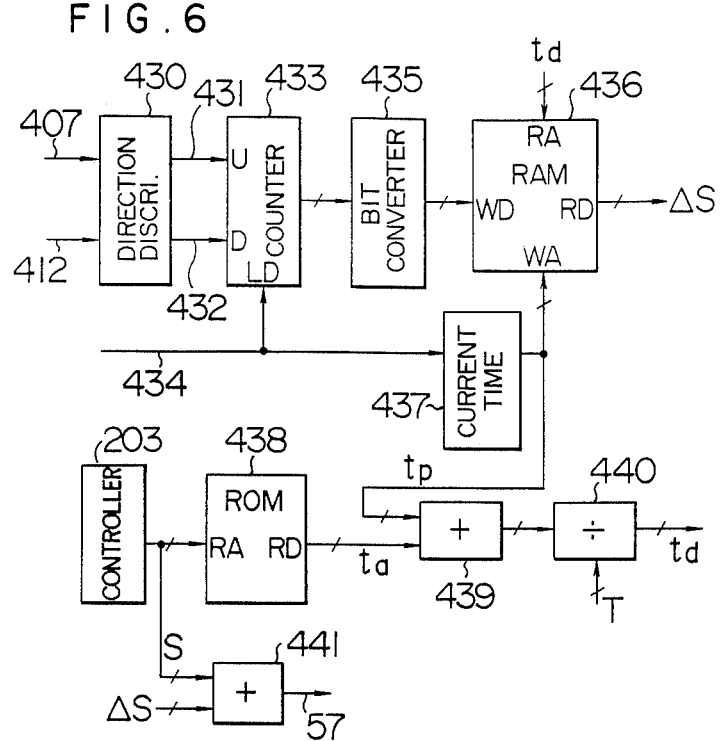
FIG. 6 is a block diagram of an embodiment of an eccentricity correction circuit 40 of the present invention.
Figure 7:
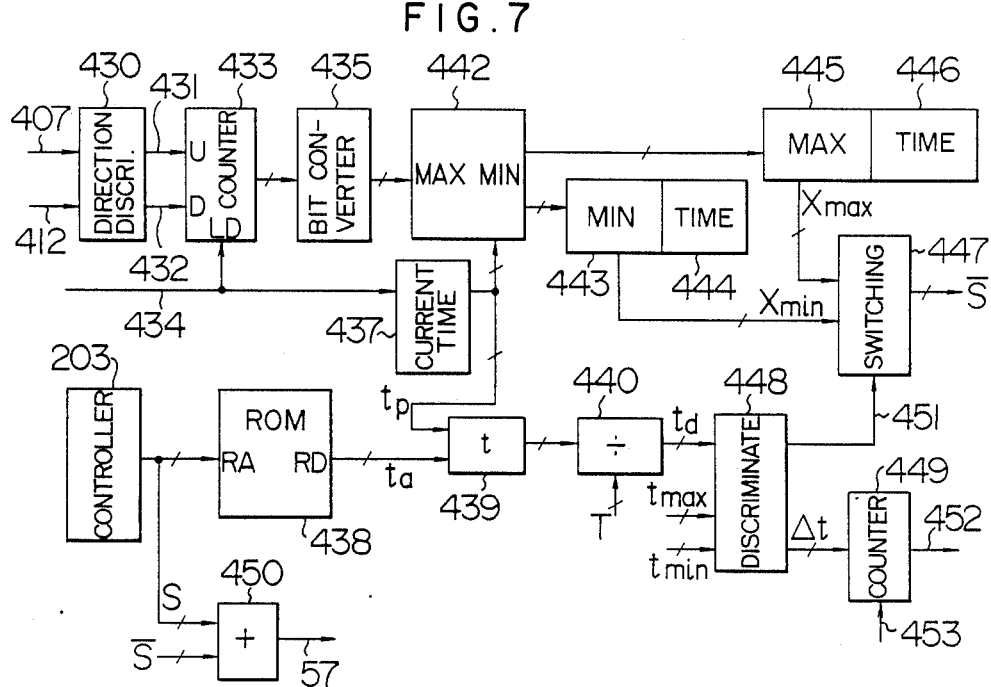
FIG. 7 is a block diagram of another embodiment of the eccentricity correction circuit 40.
Figure 8A:
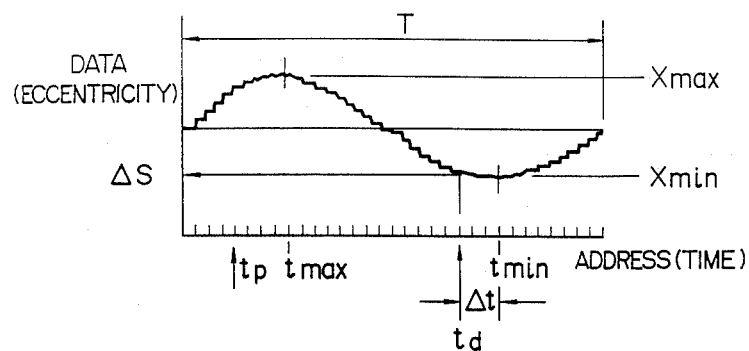
FIGS. 8(a) and 8(b) illustrate a memory space of memories 436 and 438 used in the condition or status of the present invention.

The eccentricity correction circuit 40 is now explained with reference to FIGS. 6, 7 and 8. When the optical disk storage is started or when a disk is loaded, the optical head is positioned at a radially innermost position of the disk by the external scale. As the disk rotation reaches a steady state, the light spot is focused onto the disk surface so that the apparatus is rendered ready for use. If an eccentricity exists, a phase relationship between the tracking error signal 407 and the signal 412 which represents a total light intensity of the light from the disk transmitted through the object lens changes each time the light spot passes through the track as the disk is rotated. The eccentricity can be detected based on those two signals 407 and 412. As shown in FIG. 6, the signals 407 and 412 are supplied to a direction discriminator 430 which produces a pulse indicating the direction of movement each time the light spot passes through the track (for example, a pulse signal 431 when the light spot passes from an inner track to an outer track, and a signal 432 in the opposite case). The signals 431 and 432 are supplied to a count-up (U) input and a count-down (D) input of an up/down counter 433, respectively. The counter 433 is started by a pulse signal 434 which is generated for each revolution of the disk. For example, the pulse signal may be a signal detected from a slit formed at a position of a rotating encoder one per revolution. Thus, the output of the counter 433 represents the track pitch in units of which the eccentricity is represented. It is supplied to a bit converter 435 to convert it to a linear scale pitch, thus representing the eccentricity in units of the linear scale pitch. The converted data is written into a RAM 436. A data $t_p$ from a current time generator 437 which generates the data corresponding to a time measured based on the pulse signal 434 is used as an address to the RAM. Thus, as shown in FIG. 8(a), a history of the disk eccentricity with the address represented by time and the record data represented as the eccentricity is stored in a memory space of the RAM 436.

A method for correcting the distance of movement in the macro-seek in accordance with the detected eccentricity is now explained. By previously determining a time required for the macro-seek, the distance of movement of the target track can be predicted from the detected eccentricity, and if the distance S of movement in the macro-seek is corrected based on the predicted distance of movement, the light spot can be approached to the target track in the macro-seek without error due to the eccentricity.

Figure 8B:
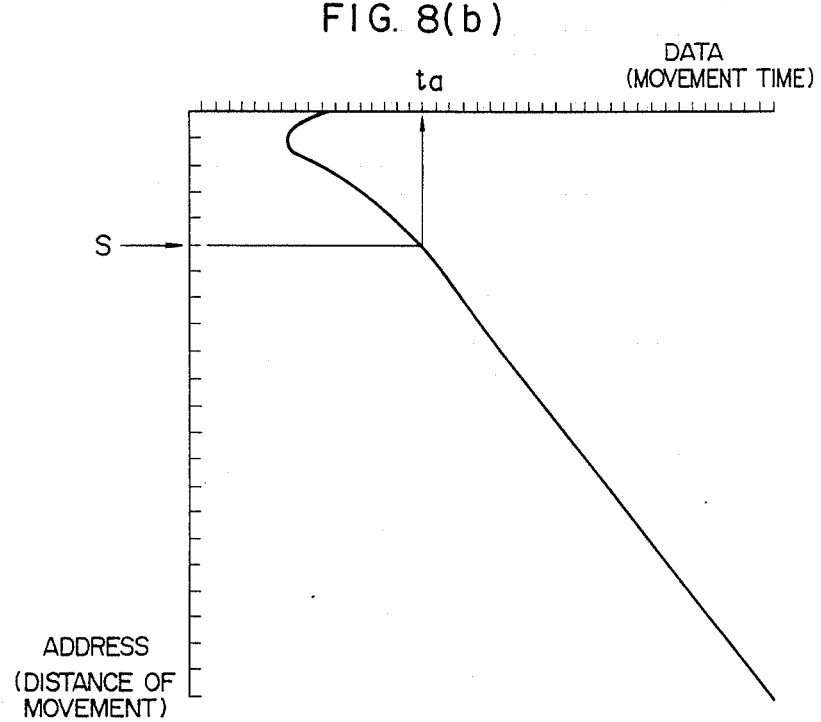

FIG. 6 shows a configuration to attain the above method. An access controller 203 instructs the distance S of movement in the macro-seek by the unit of the external scale pitch, and the distance S of movement is applied as an address to the ROM 438. The memory space of the ROM 438 contains the macro-seek characteristic with the address represented by the distance of movement of the optical head and the record data represented by the time of movement as shown in FIG. 8(b). The characteristic includes all times necessary for the macro-seek, such as acceleration time, deceleration time and setting time. Since the external scale which is absolutely stable against a change of environment is used, the deviation of the characteristic of the macro-seek operation is small. Thus, the time which reads out ROM 438 by instructing the distance of the movement S agress with the time measured for the macro-seek and this agreement has good repeatability. Accordingly, based on the detector and the mechanism as given, the characteristic curve is uniquely determined and it is stored in the ROM 438. Where the characteristic changes, a RAM may be used instead of the ROM 438 and the time characteristic of the macro-seek may be occasionally measured and corrected.

When the distance S of movement is supplied as the address to the ROM 438, the time of movement $t_a$ is read out. In order to determine the distance of movement to the target track after the movement time $t_a$ when the macro-seek is started at the current time $t_p$, the data $t_a$ and $t_p$ are summed by an adder 439, an output thereof is supplied to a divider 440, which divides it by a data corresponding to a rotation period T of the disk, and produces a residue $t_d$. The residue $t_d$ is supplied to the read address of the RAM 436 so that the distance of movement of the target track due to the eccentricity after the movement time $t_a$, that is, the correction amount $\Delta s$ for the distance of movement in the macro-seek is obtained as shown in FIG. 8(a). The correction amount $\Delta S$ is applied to an adder 441 together with S, and an output of the adder 441 is used as the signal 57 which is supplied to the counter 81 of FIG. 1 as the distance of movement in the macro-seek.

Another embodiment of the eccentricity correction circuit 40 is explained with reference to FIGS. 7 and 8. If the eccentricity is large or the rotation speed is high, the light spot may not be pulled into the track even if it was positioned in the macro-seek to the vicinity of the target track as shown in the previous embodiment. The start timing of the macro-seek is adjusted at the end of the movement in the macro seek such that the eccentricity speed of the track is at a minimum point ($t_{max.}$ and $t_{min.}$ in FIG. 8(a)). FIG. 7 shows a circuit to realize it. The output of the bit converter 435 which indicates the eccentricity is supplied to a max/min detection circuit 442 which is timed by the current time $t_p$. The max/min detection circuit 442 has a memory which holds a previous state and compares the sequentially inputted data with the content of the memory and replaces the content of the memory in accordance with the compare result. By the detection circuit 442, the maximum eccentricity $x_{max}$ is stored in a memory 445, a time $t_{max}$ for the maximum value $X_{max}$ is stored in a memory 446, the minimum value $X_{min}$ is stored in a memory 443 and a time $t_{min}$ for the minimum value $X_{min}$ is stored in a memory 444.

As the distance S of movement in the macro-seek is designated, the movement time $t_a$ is determined in the same manner as the previous embodiment and it is operated with the current time $t_p$ to determine the residue time $t_d$. The times $t_d$, $t_{max}$ and $t_{min}$ are supplied to a discrimination circuit 448 which generates a signal 451 to specify a waiting time $\Delta t$ from the current time to start the macro-seek and the correction distance $\overline{S}$ of movement, in accordance with the compare result.

Namely, when $t_{max} < t_{min}$, a data switching circuit 447 which is controlled by the signal 451 of the discrimination circuit 448 produces the following outputs:

$\Delta t$ is $t_{max} - t_d$ and $\overline{S}$ is $X_{max}$ if $t_d \lesssim t_{max}$, $\Delta t$ is $t_{min} - t_d$ and $\overline{S}$ is $X_{min}$ if $t_{max} < t_d < T_{min}$, and $\Delta t$ is $T + t_{max} - t_d$ and $\overline{S}$ is $X_{max}$ if $t_d \gtrsim t_{min}$.

The discrimination circuit 448 may be realized by a conventional general-purpose microcomputer.

The $\Delta t$ is loaded to a counter 449 which is counted down by a clock 453 of a predetermined period, and produces a timing signal 452 to start the macro-seek when the content reaches zero. The signal 452 may be used as the load signal to the counter 81 of FIG. 1. The signals $\overline{S}$ and S are supplied to an adder 450, and the output of the adder 450 is used as the input signal 57 to the counter 81.

In the present embodiment, the pull-in to the track after the macro-seek can be stably carried out in a short access time.

Figure 9:
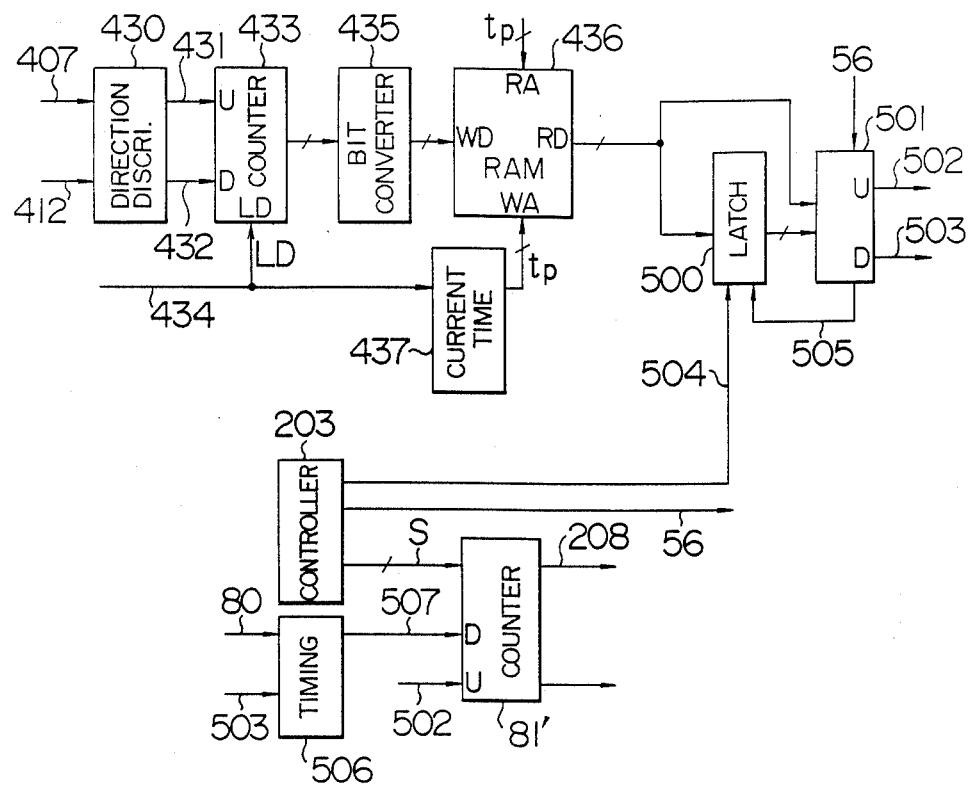
FIG. 9 is a block diagram of other embodiment of the eccentricity correction circuit 40.
Figure 10:
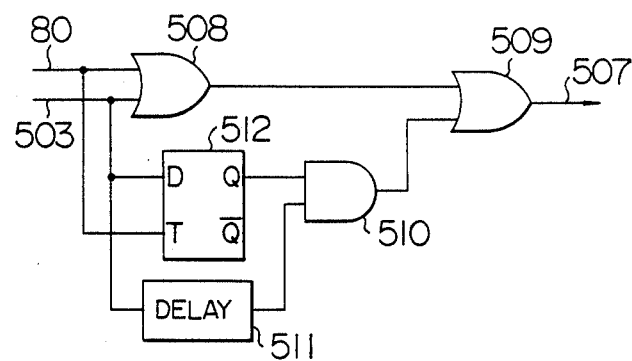
FIG. 10 is a block diagram of a timing adjusting circuit 506 of FIG. 9.

Another embodiment of the eccentricity correction circuit 40 is explained with reference to FIGS. 9 and 10. The eccentricity is detected in the same manner as the embodiment of FIG. 6 but the distance S of movement in the macro-seek is corrected in a different manner. In FIG. 9, the current time $t_p$ is supplied to the readout input RA of the eccentricity memory 436 so that the eccentricity status is always read out to the output RD of the RAM 436. The output is supplied to a latch circuit 500 and one input of an operation circuit 501. The output of the latch circuit 500 is supplied to the other input of the operation circuit 501. The read-in by the latch circuit 500 is timed by an access start timing signal 504 supplied from a controller 203. Thus, the latch circuit 500 latches the eccentricity status at the start of access. The operation circuit 501 calculates a difference between the output of the latch circuit 500 and the RD which indicates the current eccentricity status. The operation circuit 501 produces a pulse 502 at an output U when the difference increases by +1 a linear scale pitch, and a pulse 503 at an output D when the difference decreases by −1 a linear scale pitch. It also produces a timing signal 505 so that the output of the RD is read into the latch circuit 500.

Since the increment/decrement direction is determined as the positive direction the direction of movement of the head, a polarity signal 56 to indicate the direction of movement is also supplied to the operation circuit 501. The macro-seek control of the present embodiment is explained below for different points from that of the embodiment of FIG. 1.

The difference S corresponding to the number of linear scales supplied from the controller 203 is supplied to an up/down counter 81'. The output signal 502 of the operation circuit 501 is supplied to the up input U of the up/down counter 81', and an output signal 507 of a timing adjusting circuit 506 is applied to the down input D. The timing adjusting circuit 506 logically ORs a scale pitch detection signal 80 and the output signal 503 of the operation circuit 501. The signal 80 and the signal 503 may be coincident at some timing. If they are coincident, the timing is adjusted such that one of them is selected with priority and the other is retarded. In the present embodiment, the timing adjusting circuit 506 and the up/down counter 81' are used in place of the counter 81 of FIG. 1. An embodiment of the timing adjusting circuit 506 is shown in FIG. 10 in which the signal 80 and the signal 503 having a pulse width of approximately 100 nsec are supplied to an OR circuit 508, and the signal 503 is applied to a D terminal of a D-T flip-flop 512 and the signal 80 is applied to a T terminal of the flip-flop 512. The output Q of the flip-flop 512 and the signal 503 delayed by a delay line 511 (having a delay time which is slightly longer than the pulse width) are supplied to an AND circuit 510, and the output of the AND circuit 510 is supplied to one input of an OR circuit 509. The output of the OR circuit 508 is supplied to the other input of the OR circuit 509. Thus, even if the signal 80 and the signal 503 are coincident, the signal 503 appears in the signal 507 with a delay time due to the delay line 21.

Figure 11:
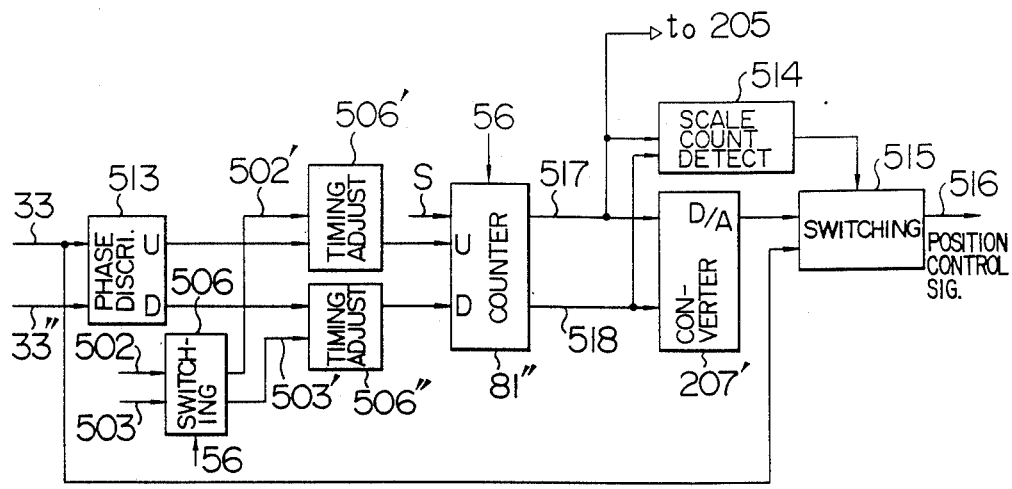
FIG. 11 is a block diagram of another embodiment of the present invention.

Other embodiment of the present invention is explained with reference to FIGS. 11 and 12. In the previous embodiment, the timing to switch from the speed control to the position control in the macro-seek is the time point at which the content of the counter 81 reaches "1". Alternatively, the speed control may be switched to the position control a certain number of scales before the target scale point. In order to produce a control signal for the position control, the direction of movement of the head and the number of scales through which the head has passed are detected and combined.

In one method therefor, an additional slit having a 90-degree phase shift is formed in the light-receiving area of the linear scale so that the direction of movement and the number of scales are detected based on the two signals. When a phase discrimination circuit 513 receives signals 33 and 33" having a 90-degree phase difference therebetween (the signal 33" detected from the 90-degree phase-shifted slit is shown by a broken curve in FIG. 4(a)), the phase discrimination circuit 513 produces a pulse at a U terminal for each zero point of the linear scale signal (assuming that the scale increases in the radially inward direction of the disk), and produces a pulse at a terminal D for each zero point when the head moves outward. In the present embodiment, the phase discrimination circuit 513 is used in place of the differential amplifier 71 of FIG. 1. The signal 33 is also applied to a zero-crossing detection circuit 72, and the output 80 thereof is supplied to a frequency-voltage converter 204 as is done in the embodiment of FIG. 1. The output signals at the U and D terminals of the phase discrimination circuit 513 are supplied to timing adjusting circuits 506' and 506", respectively, and pulse signals 502' and 503" for correcting the eccentricity are supplied to the other inputs of the circuits 506' and 506", respectively. The signals 502' and 503' are produced by a circuit 506 which switches the signals 502 and 503 outputted from the operation circuit 501 by the access polarity signal 56 so that the polarity of the phase discrimination circuit 513 matches the eccentricity increase/decrease direction.

The timing adjusting circuits 506' and 506" function to their inputs in the same manner as the circuit 506 does. The outputs of the circuits 506' and 506" are supplied to U and D terminals of an up/down counter 81", respectively, to which the block number difference S and the polarity signal 56 for the access direction are also applied. The counter 81" produces a +/− polarity signal 518 and an absolute value signal 517, which are supplied to a D/A converter 207', which converts them to an analog signal. The signal 517 is also applied to the ROM 205 in place of the signal 408 in FIG. 1. The signals 517 and 518 are supplied to a scale count detection circuit 514, which produces a signal to control a switching circuit 515 when the scale count reaches a predetermined count range. Assuming that the range is ±1, a position control signal 516 having a zero point as the target point on a coordinate of the linear scale can be produced by the present circuit, and the position control is effected by using the position control signal.

Figure 12:
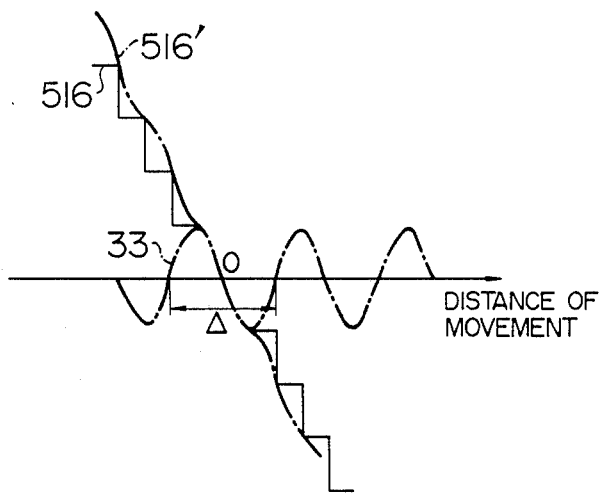
FIG. 12 shows a control signal waveform for positioning a head to a target scale point.

In FIG. 12, a position control signal 516' may be produced by directly connecting the signal 33 from the scale as shown by broken lines. This method is disclosed in IEEE Transaction of Magnetics, Vol. 14, No. 4, July, '78, "Head Position Servo Design for IBM 3344/3350 Disk File".

In order to correct the position control signal for the eccentricity, the output RD from the RAM 436 in FIG. 9 may be D/A converted to an analog signal as shown in FIG. 8(a) for analog addition, instead of the digital addition described above. In this case, the signals 502' and 503' are not necessary.

In the above embodiments, the optical head is positioned to the desired position on the linear scale. The present invention is also applicable where the optical head is to be positioned to a desired track as disclosed in the above-referenced Japanese Unexamined Patent Publication No. 58-91536. The deflector 308 and the linear motor 68 are driven by the control signal B in a linked fashion to pull the head into the nearest track. As to the speed signal 227, the direction of movement and the number of tracks disclosed in Japanese Unexamined Patent Publication No. 58-91536 are detected based on the signals 407 and 412 of FIG. 2 and the speed signal 227 includes the polarity signal so that the access operation can be more stable. The signal 412 is the sum of the outputs of the light-detectors 404 and 405 summed by the adder 413.

In accordance with the present invention, the speed control is stabilized and the access time can be shortened without being affected by the eccentricity even in the access system which uses the external scale.

We claim:

1. A method of accessing a rotating recording medium in which a light emitting head for irradiating said rotating recording medium with a light spot is controlled to move said light spot to a target track on said rotating recording medium, comprising the steps of:
   generating a scale pitch pulse for each pitch of an external scale as said head is moved;
   generating signals each time said light spot emitted from said light emitting head passes through a track on said rotating recording medium, said signals being generated based on light reflected from said rotating recording medium by irradiation thereof with said light spot;
   counting said signals and converting said signals into data which is representative of a condition of eccentricity of said rotating recording medium, said data corresponding to the pitch of said scale and being stored in an eccentricity memory means; and
   counting said scale pitch pulses to detect the number of pitches of said scale corresponding to a distance difference between a track on said rotating recording medium at which said light spot emitted from said light emitting head is presently positioned and said target track; and
   controlling the speed of movement of said light emitting head in accordance with the detected number of pitches to move said light spot to said target track, said controlling step including the steps of reading at least part of said data from said eccentricity memory means to correct said number of pitches and correcting the amount of movement of said light emitting head in accordance with the corrected number of pitches.

2. A method of accessing a rotating recording medium according to claim 1, further comprising the steps of:
   detecting a first speed signal indicating the speed of movement of said light emitting head based on one of said signals generated each time said light spot passes through a track on said rotating recording medium as said light emitting head is moved;
   detecting a second speed signal indicating the speed of movement of said light emitting head based on said scale pitch pulses;
   selecting one of said first and second speed signals based on the magnitudes thereof;
   detecting a speed difference between said selected speed signal and a target speed signal; and
   moving said light emitting head based on said detected speed difference.

3. A method of accessing a rotating recording medium according to claim 1, wherein said data is stored in said eccentricity memory means with an address represented by a time measured from a predetermined point of time during any one rotation of said rotating recording medium.

4. A method of accessing a rotating recording medium according to claim 3, wherein a movement time required for moving said light emitting head to said target track in accordance with said number of pitches is stored in a time memory means, an address of said eccentricity memory means is determined based on said movement time read from said time memory means and a current time, and said number of pitches is corrected by said data corresponding to the determined address of said eccentricity memory means.

5. A method of accessing a rotating recording medium according to claim 3, wherein said data is read from successive addresses of said eccentricity memory means while being latched at a predetermined timing, a difference between the latched data and the data currently read from said eccentricity memory means is calculated to generate a pulse each time the calculated difference increases or decreases by one pitch of said scale, and said number of pitches is corrected by said pulse.

6. A method of accessing a rotating recording medium according to claim 1, wherein said data is stored in terms of maximum and minimum values of an eccentricity and times of occurrences of said maximum and minimum values.

7. An information retrieval apparatus comprising:
a rotating recording medium having a plurality of tracks;
a light emitting head for irradiating said rotating recording medium with a light spot;
head drive means for moving said light emitting head;
head position detection means having a scale with a coarser pitch pulse than that of said tracks for generating a scale pitch pulse for each pitch of said scale as said head is moved; and
control means for counting the scale pitch pulses generated from said head position detection means to detect the number of pitches of said scale corresponding to a difference between a track on said rotating recording medium at which said light spot emitted from said light emitting head is currently positioned and a target track on said rotating recording medium and for generating a control signal for said head drive means to control the speed of movement of said light emitting head in accordance with the detected number of pitches,
said control means including generation means for generating signals each time said light spot emitted from said light emitting head passes through a track on said rotating recording medium, said signals being generated based on light reflected from said rotating recording medium by irradiation thereof with said light spot, eccentricity detection means for detecting a condition of eccentricity of said rotating recording medium by counting said signals generated from said generation means and converting them into data corresponding to the pitch of said scale, eccentricity memory means for storing said data detected by said eccentricity detection means, and correction means for correcting said number of pitches based on a least part of said data read from said eccentricity memory means, thereby correcting the speed of movement of said light emitting head in accordance with the corrected number of pitches.

8. An information retrieval apparatus according to claim 7, wherein said control means further includes first speed detection means for detecting the speed for movement of said light emitting head based on one of said signals generated each time said light spot passes through a track on said rotating recording medium as said light emitting head is moved, second speed detection means for detecting the speed of movement of said light emitting head based on said scale pitch pulses, selection means for selecting one of the outputs of said first and second speed detection means based on the magnitudes thereof, means for generating a target speed signal corresponding to said corrected number of pitches, and means for detecting a difference between the output of said selection means and the output of said target speed signal generation means.

9. An information retrieval apparatus according to claim 7, wherein said eccentricity memory means is a random access memory with addresses represented by times measured from a predetermined point of time during any one rotation of said rotating recording medium.

10. An information retrieval apparatus according to claim 7, wherein said eccentricity memory means stores maximum and minimum values of an eccentricity condition and times of occurences of said maximum and minimum values.

* * * * *

UNITED STATES PATENT AND TRADEMARK OFFICE
CERTIFICATE OF CORRECTION

PATENT NO.   :   4,745,587
DATED        :   May 17, 1988
INVENTOR(S)  :   MAEDA, et al

It is certified that error appears in the above—identified patent and that said Letters Patent is hereby corrected as shown below:

Title page:

Please correct the [21] Appl. No. from "639,541" to --839,541--.

Signed and Sealed this

Twenty-seventh Day of December, 1988

Attest:

DONALD J. QUIGG

*Attesting Officer*         *Commissioner of Patents and Trademarks*